United States Patent [19]

Schneider et al.

[11] Patent Number: 4,930,428

[45] Date of Patent: Jun. 5, 1990

[54] CEMENT COMPOSITION COMPRISING SODIUM TRIPOLYPHOSPHATE AND PROCESS FOR FORMING SHAPED ARTICLES THEREFROM

[76] Inventors: John F. Schneider; Kurt A. Schneider, both of 3956 - 200th St. E., Farmington, Minn. 55024

[21] Appl. No.: 360,284

[22] Filed: Jun. 2, 1989

[51] Int. Cl.$^5$ .............................................. C04B 22/16
[52] U.S. Cl. .................................... 106/640; 106/705; 106/679; 106/709; 106/641; 106/643
[58] Field of Search ............................... 106/90, 84, 98

[56] References Cited

U.S. PATENT DOCUMENTS 2,892,728  6/1959  Jolly ....................................... 106/90
4,111,711  9/1978  Kiehl et al. ............................ 106/98
4,382,820  5/1983  Inoue ..................................... 106/90

OTHER PUBLICATIONS

Dodd, *Dictionary of Ceramics* 66, (1964).
Annual Handbook of ASTM Standards, vol. 4.01 and 4.02, (1987).

*Primary Examiner*—William R. Dixon, Jr.
*Assistant Examiner*—C. Melissa Bonner
*Attorney, Agent, or Firm*—Merchant, Gould, Smith, Edell, Welter & Schmidt

[57] ABSTRACT

Improved cement compositions having greater strength, density, and lesser porosity, than concretes previously known are provided, which are prepared with water which been treated so as to comprise a residual amount of sodium tripolyphosphate. Methods of forming high-strength shaped articles are also provided.

35 Claims, No Drawings

CEMENT COMPOSITION COMPRISING SODIUM TRIPOLYPHOSPHATE AND PROCESS FOR FORMING SHAPED ARTICLES THEREFROM

FIELD OF THE INVENTION

The present invention is directed to improved cement compositions having greater strength, density, and lesser porosity, than cement compositions previously known. More particularly, the invention is directed to cement compositions prepared from sodium tripolyphosphate in an aqueous solution, and to methods of forming high-strength shaped articles.

BACKGROUND OF THE INVENTION

Inorganic cements exhibit characteristic properties of setting and hardening when mixed with water to form a paste. They are capable of joining rigid solid masses into coherent structures. Inorganic cements can be divided into hydraulic and nonhydraulic types according to the way in which they set and harden. Hydraulic cements are capable of setting and hardening under water, whereas nonhydraulic cements harden in air and cannot be used under water. See Z. D. Jastrebski, *The Nature and Properties of Engineering Materials*, 2d. Ed., John Wiley & Sons, New York (1977) at 356, the disclosure of which is incorporated by reference herein.

The most widely-used hydraulic cement is so-called Portland cement, which is obtained by heating an intimate mixture, composed mainly of calcareous and argillaceous materials, or other silica, alumina, and iron-oxide bearing materials, at a clinkering temperature of about 1400° C. The partially sintered material, called clinker, is then ground to a very fine powder. After mixing with water, a hardened Portland cement paste is a calcium-silicate hydrate (C-S-H) which, like other gels, contains a network of capillary pores and gel pores. The total porosity of a typical hardened Portland cement paste is about 30–40% by volume, having a very wide pore-size distribution ranging from 10–0.002 $\mu$m in diameter. The gel porosity, consisting of very small pores, is about 26%, with the remaining porosity due to capillary network. See Z. D. Jastrebski, supra, at 356–61.

Cement formulations may also contain additional additives. For example, small amounts of calcium sulfate in the form of gypsum or anhydrite may be added during grinding of the raw materials to control the setting time and enhance strength development of Portland cement. Cements are sometimes impregnated with liquid organic monomers or liquid sulfur and polymerized to produce polymer-impregnated concrete. See 5 *Kirk-Othmer Encyclopedia of Chemical Technology*, 3rd. ed., John Wiley & Sons, New York (1978) at 163, the disclosure of which is incorporated by reference herein. Other additives include water reducers, plasticizers, air entrainment, microsilicates, and the like.

Several methods of increasing the strength of cement are known. For example, high-strength Portland cement pastes can be produced using specially ground cement with the assistance of surfactant grinding aids to produce surface areas ranging from 0.6 to 0.9 m²/g. When mixed with water and plasticizing agents, the hardened pastes show decreased porosity and compressive strength which is about twice the strength of cement pastes produced by conventional methods. See Z. D. Jastrebski, supra, at 361.

High strength cements are also obtained by hot pressing conventional cement pastes under pressure of 196 to 392 MPa and at a temperature of 150° C. The hardened cement paste thus obtained exhibits nearly zero porosity and shows compression strength, tensile strength, and shear strength values which are about four times greater than the strengths of cement pastes produced by conventional methods. See Z. D. Jastrebski, supra, at 361.

Although known methods of improving the strength of hardened cement can be quite effective, they necessitate specialized, time-consuming processing steps such as grinding and hot pressing. In addition, the cement compositions themselves may have to be modified by the addition of expensive specialty chemicals.

Therefore, there is a need for easily, inexpensively-obtained concrete compositions having higher strength and density, and lesser porosity, than or concrete compositions currently available.

There is also a need for simple, inexpensive methods of improving the strength and other desired properties of concrete.

Accordingly, it is an object of the present invention to provide a high-strength concrete composition having greater strength and density, and lesser porosity, than or concrete compositions previously known.

It is also an object of the present invention to provide a method of manufacturing a high-strength shaped article.

SUMMARY OF THE INVENTION

The forgoing objects are accomplished by a high-strength concrete composition formed from a mixture of the following ingredients: about 0 to about 85 percent by weight of aggregate, about 7 to about 90 percent by weight of dry cement, about 3 to about 10 percent by weight of treated water, and about 0 to about 50 percent by weight of fly ash, the percentages by weight being relative to the weight of the total composition. The treated water contains about 0.5 to about 100 parts per million of residual sodium tripolyphosphate.

The present invention is also directed to a process for manufacturing a high-strength shaped article. The process includes the steps of treating water with an amount of sodium tripolyphosphate in excess of a water softening amount to produce a treated water; mixing the treated water with optional aggregate, dry cement, and optional fly ash to form a fluid cementitious mixture; pouring the fluid cementitious mixture into a casing; and allowing the mixture to harden into the high-strength shaped article.

Advantageously, shaped articles formed from the present high-strength concrete composition exhibit surprisingly higher strength, density, and lesser porosity than cement compositions or concretes not incorporating sodium tripolyphosphate.

Furthermore, in certain embodiments, the present concrete composition advantageously requires the addition of about 10–15% less water per given amount of dry cement than the formulations currently used in industry.

DETAILED DESCRIPTION OF THE INVENTION

The present invention provides a high-strength concrete composition produced from a mixture of dry cement, optional aggregate, optional fly ash, and sodium tripolyphosphate (STP) in aqeous solution (treated water). More particularly, the present high-strength concrete composition is formed from a combination of ingredients including about 0–85 weight percent aggregate, about 7–90 weight percent dry cement, about 3–10 weight percent of treated water, and about 0–50 percent fly ash (dry weight). Preferably, the combination of ingredients includes about 77–82 weight percent aggregate, about 9–12 weight percent dry cement, about 5–7 weight percent treated water, and about 1–4 weight percent fly ash. An especially preferred combination of ingredients contains about 80 weight percent aggregate, about 10 weight percent dry cement, about 6.5 weight percent treated water, and about 3 weight percent fly ash.

The "treated water" is produced by adding an excess of STP over the amount that effectively softens the water to be mixed with the dry, cementitious ingredients of the composition, i.e. the optional aggregate, dry cement, and optional fly ash. The addition of excess STP produces treated water having a residual amount of STP, preferably at about 0.5–100 parts per million (ppm). More preferably, the treated water will contain about 1–25 ppm of the residual STP and most preferably, about 6–12 ppm of the residual STP.

Sodium tripolyphosphate ($Na_5P_3O_{10}$), a widely-used water-softening agent, is the sodium metal salt of an anion of the general formula $[P_nO_{3n+1}]^{(n+2)-}$, where $n=3$. Sodium tripolyphosphate (STP) is a linear polyphosphate which can be prepared by the molecular dehydration of mono- and disodium phosphates. See *The Merck Index*, 10th Ed., M. Windholz et al., eds., Merck & Co. (1983) at Entry 8544, the disclosure of which is incorporated by reference herein. For the purposes of this invention, it is desirable to combine this polymeric form of STP with the dry cement, optional aggregate, and optional fly ash. If the STP is allowed to re-hydrate or otherwise rearrange or react with the water before it is combined with the dry cement, optional aggregate, and optional fly ash, the high-strength concrete composition cannot be produced.

The "dry cement" of the present invention is the common, dry, powdery cementitious starting material or "dry mix" that is typically mixed with water to form a cement paste. The present composition includes about 7–90 weight percent of dry cement, preferably about 9–12 weight percent. In one embodiment, the ratio of dry cement to treated water is about 4:1 to about 1:1, preferably about 2:1 to about 1.5:1, with the proviso that the amounts of dry cement and remaining ingredients are sufficient to provide the slurry flow properties appropriate to the casting being formed.

The dry cement to be mixed with the treated water is preferably of the type known as Portland cement. While any of the commercially available Portland cements can be conveniently used, a preferred chemical composition of a dry Portland cement useful in the present high-strength cement composition is shown in Table 1 below:

TABLE 1

| Dry Portland Cement Composition | |
| --- | --- |
| Component | Approximate Weight % |
| Tricalcium silicate ($3CaO.SiO_2$): | 45–50 |
| Dicalcium silicate ($2CaO.SiO_2$): | 22–27 |
| Tricalcium aluminate ($3CaO.Al_2O_3$): | 10–15 |
| Tetracalcium aluminoferrite | 5–10 |

TABLE 1-continued

| Dry Portland Cement Composition | |
| --- | --- |
| Component | Approximate Weight % |
| ($4CaO.Al_2O_3.Fe_2O_3$): | |
| Calcium sulfate ($CaSO_4$): | 2–4 |
| Calcium oxide (free CaO): | 0.5–1.0 |
| Magnesium oxide (free MgO): | 2–4 |
| Ignition Loss | 0.5–2.0 |

The "aggregate" of the present high-strength composition is any combination of particulate natural minerals, such as stone, sand, or the like, but does not include any substantial amount of soil or dirt. The addition of aggregate to the dry cement and the optional fly ash is not required in the present composition. More specifically, the present invention encompasses high-strength concrete compositions in which neither aggregate nor fly ash is present. Cement-based compositions lacking both fly ash and aggregate are generally referred to in the cement industry as "neat" cement.

The "fly ash" of the present high-strength composition is the particulate, non-combustible by-product of a combustion process such as the burning of coal. The addition of fly ash to the dry cement and the optional aggregate is not required in the present invention.

A particularly preferred formulation of the present composition is formed from a combination of ingredients including about 3000–3100 pounds of aggregate, about 380–400 pounds of dry "Portland" cement, about 110–130 pounds fly ash, and about 240–260 pounds of water treated with sodium tripolyphosphate so as to retain about 5–25 parts per million of residual sodium tripolyphosphate.

The combination of ingredients from which the present high-strength concrete composition is formed may optionally include one or more metal or metal oxide additives. The metal or metal oxide additives may represent up to about 10% of the total weight of the dry ingredients. Suitable metal additives include aluminum, iron, chromium, manganese, lead, microsilicates, or a mixture or alloy thereof.

The present composition may also be mixed as a castable cementitious composition. These compositions generally contain more dry Portland cement than the usual poured compositions, and are used commercially, for example, for manufacturing culverts. When a casting composition is formed from treated water according to the present invention, it has been observed that the amount of dry Portland cement needed is less than the typical amount employed. When a typical amount (e.g., about 9 to 30 weight percent) of dry Portland cement is employed in combination with treated water, the resulting mixture becomes too thick to cast. Thus, an effective high-strength castable cementitious composition according to the present invention can be formed by employing about 8–20 weight percent dry Portland cement, about 5–20 weight percent treated water, optionally about 0–85 weight percent aggregate, and optionally about 0–50 weight percent fly ash.

The actual chemical and/or physical mechanism by which the present high-strength composition is formed is not known. While they are not intended as limitations or parameters of the present invention, there are several theories which may explain this phenomenon. One possible mechanism is that the residual sodium tripolyphosphate present in the treated water catalyzes a reaction of inorganic oxide ingredients in the dry cement and/or the aggregate to form strength-imparting inorganic oxide polymers. Another possibility is that the sodium tripolyphosphate may enter into a polymerization reaction as a minor ingredient which causes a major effect. With either possibility, the oxygen atoms of the sodium tripolyphosphate ($Na_5P_3O_{10}$) may combine with or be shared by the octet sites of inorganic oxides such as $3CaO \cdot SiO_2$ which are present in the dry cement. The "tying up" of the free oxygen ends of the sodium tripolyphosphate is believed to continue at a rapid pace, during which time a crystalline matrix is being formed. This process may continue until all the remaining residual sodium tripolyphosphate has combined with the metal oxides.

The sodium tripolyphosphate, being present in a residual amount of less than about 100 ppm relative to the total concrete composition, is the limiting reactant. After all the residual sodium tripolyphosphate has somehow been combined into the hardening concrete paste, it is believed that hardening and curing occur at a much slower rate than the initial rate encountered.

The structure of an ordinary hardened concrete is the result of hydration reactions occurring between the cementitious ingredients and water. When dry Portland cement is mixed with water to form a paste, these hydration reactions begin and result in the formation of gel and crystalline structures that constitute an integrated, three-dimensional matrix throughout the hardened product. See Z. D. Jastrebski, supra, at 358-359. This is believed to be the internal structure of ordinary concrete.

This gel and crystalline structure is believed to be enhanced according to the present invention by utilization of the sodium tripolyphosphate as a basic framework or starting point for the formation of polymeric inorganic oxide structures. By adding sodium tripolyphosphate to the basic framework, a significant increase in structural strength through a more tightly bound matrix is believed to be achieved. The addition of sodium tripolyphosphate is believed to result in a more uniform dispersion of the cementitious ingredients throughout the hardened product.

It is also possible that sodium tripolyphosphate may exert a strength-enhancing effect upon the molecular structure of cement in a manner analogous to the "doping" of metals. In alloy preparation, for example, the crystalline structure of the intrinsic material such as silicon can be deliberately "doped" with a trace amount of an impurity such as chromium. The impurity atom replaces an intrinsic atom, thereby altering the metallic crystal structure and the properties of the metal. See W. J. Moore, *Basic Physical Chemistry*, Prentice-Hall, Inc., Englewood Cliffs, N.J. (1983) at 660; F. A. Cotton and G. Wilkinson, *Advanced Inorganic Chemistry*, John Wiley & Sons, New York (1980) at 26; the disclosures of which are incorporated by reference herein. Analogously, sodium tripolyphosphate molecules may act as an "impurity" which occupies a site in the crystalline matrix of the present high-strength cement composition. Thus, the addition of a very small amount of sodium tripolyphosphate present in the cement matrix as an impurity therein could significantly enhance the strength of the entire crystalline structure.

The present invention also provides a process for manufacturing a high-strength shaped article. The initial step in the process involves treating water with an excess amount of sodium tripolyphosphate (STP). The "excess amount" is enough to provide a residual amount of STP in the water in addition to the amount that softens the water by solubilizing the metal salts present therein. This residual amount of STP can be from about 0.5-100 parts per million of the treated water, preferably about 5-25 ppm, and most preferably about 6-12 ppm. Above approximately 100-150 ppm of STP, the strength-enhancing effect according to the present invention decreases. It is believed that these higher amounts of STP begin to cause other reactions in the cementitious composition which lead to its eventual breakdown or decomposition.

Following the addition of sodium tripolyphosphate, the treated water is mixed with dry, cementitious ingredients which include dry cement, optional aggregate, and optional fly ash to form a fluid cementitious mixture or paste. Mixing may be performed by any means and for any length of time which result in the formation of an evenly mixed, homogenous mixture, but most typically is performed by means of a rotating drum arrangement such as an industrial cement mixer. The typical mixing time for a 4000 pound batch of concrete is about 90 seconds when the concrete is mixed in a batching plant, and about 9 minutes when mixing occurs in a truck having a rotating drum.

The treated water must be mixed with the dry cement, optional aggregate, and optional fly ash within a period of time effective to prevent a substantial reduction of the strength-enhancing effect of the treated water. Preferably, the treated water is mixed with the dry cement, optional aggregate, and optional fly ash within about 0-4 days from the addition of the sodium tripolyphosphate to the water.

Although the reasons for the decrease in strength enhancement after this effective time period has lapsed are not known, a possible explanation is that after this period, the STP begins to undergo a hydrolysis reaction and breaks down to its mono- and disodium precursors. Alternatively, the STP may undergo a polymerization reaction or structural transformation to a cyclic polyphosphate, such as sodium trimetaphosphate or sodium tetrametaphosphate. Regardless of the mechanism responsible, after the effective period of time for addition of the treated water to the dry cement, optional aggregate and optional fly ash has lapsed, it is believed that the concrete compositions prepared begin to lose their substantially high strength according to the present invention.

When the treated water and dry cement, optional aggregate, and optional fly ash have been sufficiently mixed so as to form a homogenous mixture, the fluid cementitious mixture or paste can then be poured into any suitable casing, shell, or mold, shaped according to the desired form of the article to be manufactured. The cementitious mixture is then allowed to harden until substantially solidified, preferably at room temperature for at least 1 day.

The present method also optionally includes the additional step of adding one or more metal or metal oxide additives to the fluid cementitious mixture or paste prior to pouring it into the casing, shell, or mold. For example, a powdered mixture of chrome manganese and silicates may be added to the dry cement before mixing it with the treated water. The metal or metal oxide additives may represent up to about 10% of the total weight of the dry ingredients. Suitable metal additives can be selected on the basis of the properties desired to be imparted to the cementitious mixture. For example, addition of a lead imparts increased density. Other examples of metal additives include aluminum, iron, chromium, manganese, lead, microsilicates, or a mixture or alloy thereof.

It has been found that the high-strength concrete compositions of the present invention exhibit substantially higher compression and torque strength, substantially higher density, and substantially lower porosity than concretes prepared from the same amounts of ingredients but with about 1–15% of water that is free of residual sodium tripolyphosphate. Moreover, many of the properties of the metal or metal oxide additive, such as flex strength, tensile strength, and the like are surprisingly imparted to the present high-strength concrete compositions when they incorporate such additives. Generally, these enhanced properties or performance values include an about 5–45 percent greater compression and torque strength, an about 5–15 percent greater density, and an about 3–7 percent lower porosity. Preferred performance values include an about 35–40 percent greater compression and torque strength, an about 7–10 percent greater density, and an about 4–6 percent lower porosity.

The invention will be further described by reference to the following detailed example.

EXAMPLE

Three concrete pastes were prepared by mixing the following ingredients in the amounts stated:

Formulation A 390 pounds dry Portland cement (Northwestern States Portland Cement, Mason City, Iowa);
250 pounds untreated water (well water, ambient temperature, 100–240 ppm hardness);
3090 pounds aggregate (washed stones from 0.25 to 0.75 inch in diameter); and
120 pounds fly ash (Class 3 fly ash from a coal-fired electric plant)

Formulation B 390 pounds dry Portland cement;
250 pounds water treated with an excess of $Na_5P_3O_{10}$ (industrial-grade water treatment STP) to give a residual concentration of 8 ppm;
3090 pounds aggregate; and
120 pounds fly ash Formulation C 390 pounds dry Portland cement;
250 pounds water treated with an excess of $Na_5P_3O_{10}$ to give a residual concentration of 8 ppm;
50 pounds powdered mixture of chrome manganese and silicates (dust from chrome-containing minerals);
3090 pounds aggregate; and
120 pounds fly ash Within one-half hour of mixing the water with the remaining ingredients, each of the three resulting pastes was poured into a cylindrical mold of about 1 cubic yard in volume and allowed to cure for 28 days.

Strength measurements were made of each cylinder at 7 days and 28 days by measuring strength in compression (PSI). The results are shown in Table 2 below:

TABLE 2

| Formulation | Results of Strength Testing | |
| --- | --- | --- |
| | Strength[1] at 7 Days | Strength at 28 Days |
| A | 3090 | 4405 |
| B | 4350 | 6125 |
| C | 4450 | 6250 |

[1]Strength measured as breaking strength of the cylinder

Comparison of the above results revealed that the cement cylinder formed from Preparation B (formed with water treated with an excess of sodium tripolyphosphate) was about 41% stronger after 7 days of curing than the cylinder formed from Preparation A (formed with untreated water), and about 39% stronger after 28 days of curing.

The invention has been described with reference to various specific and preferred embodiments and techniques. However, it should be understood that many variations may be made while remaining within the spirit and scope of the invention.

What is claimed is:

1. A high-strength concrete composition formed from a combination of ingredients comprising:
   (a) about 0–85 weight percent aggregate;
   (b) about 7–90 weight percent dry cement;
   (c) about 0–50 weight percent fly ash; and
   (d) about 3–10 weight percent treated water;
wherein the treated water contains about 0.5–100 ppm of residual sodium tripolyphosphate and the weight percents are relative to the total weight of the composition.

2. The high-strength concrete composition of claim 1, wherein the weight percent of the aggregate is about 77–82.

3. The high-strength concrete composition of claim 1, wherein the weight percent of the dry cement is about 9–12.

4. The high-strength concrete composition of claim 1, wherein the weight percent of the fly ash is about 1–4.

5. The high-strength concrete composition of claim 1, wherein no fly ash is present.

6. The high-strength concrete composition of claim 1, wherein no aggregate is present.

7. The high-strength concrete composition of claim 1, wherein no fly ash and no aggregate are present.

8. The high-strength concrete composition of claim 1, wherein the weight percent of the treated water is about 5–7.

9. The high-strength concrete composition of claim 1, wherein the treated water contains about 1–25 ppm of the residual sodium tripolyphosphate.

10. The high-strength concrete composition of claim 9, wherein the treated water contains about 6–12 ppm of the residual sodium tripolyphosphate.

11. The high-strength concrete composition of claim 1 which is formed from a combination of ingredients comprising:
   (a) about 80 weight percent of the aggregate;
   (b) about 10 weight percent of the dry cement;
   (c) about 3 weight percent of the fly ash; and
   (d) about 6.5 weight percent of the treated water.

12. The high-strength concrete composition of claim 1 which is formed from a combination of ingredients comprising about 240–260 pounds of the treated water and about 380–400 pounds of the dry cement.

13. The high-strength concrete composition of claim 1, wherein the dry cement is Portland cement.

14. The high-strength concrete composition of claim 1 which is at least about 5-45% stronger than a concrete formed from said amounts of ingredients (a) to (c) of claim 1 and about 1-15 weight percent of water which is free of residual sodium tripolyphosphate.

15. The high-strength concrete composition of claim 14 which is at least about 35-40% stronger than said concrete.

16. The high-strength concrete composition of claim 1 which is at least 5-15% more dense than a concrete formed from said amounts of ingredients (a) to (c) of claim 1 and about 1-15 weight percent of water which is free of residual sodium tripolyphosphate.

17. The high-strength concrete composition of claim 16 which is at least about 7-10% more dense than said concrete.

18. The high-strength concrete composition of claim 1 which is at least about 3-7% less porous than a concrete formed from said amounts of ingredients (a) to (c) of claim 1 and about 1-15 weight percent of water which is free of residual sodium tripolyphosphate.

19. The high-strength concrete composition of claim 18 which is at least about 4-6% less porous than said concrete.

20. The high-strength concrete composition of claim 1, wherein the combination of ingredients further comprises at least one metal additive selected from the group consisting of metals and metal oxides.

21. The high-strength concrete composition of claim 20, wherein the at least one metal additive is selected from the group consisting of aluminum, iron, chromium, manganese, lead, microsilicates, a mixture thereof and an alloy thereof.

22. A process for manufacturing a high-strength shaped article, comprising the steps of:
  (a) treating water with an excess amount of sodium tripolyphosphate to produce a treated water having from about 0.5-100 ppm residual sodium tripolyphosphate;
  (b) forming a fluid cementitious mixture by mixing about 3-10 weight percent of the treated water with dry cementitious ingredients including about 0-85 weight percent aggregate, about 7-90 weight percent dry cement, and about 0-50 weight percent fly ash within a period of time effective to prevent a substantial reduction of the strengt-enhancing effect of the treated water; and
  (c) pouring the fluid cementitious mixture into a casing so that the mixture hardens to form the shaped article.

23. The process of claim 22, wherein no fly ash is present in the fluid cementitious mixture.

24. The process of claim 22, wherein no aggregate is present in the fluid cementitious mixture.

25. The process of claim 22, wherein no aggregate and no fly ash are present in the fluid cementitious mixture.

26. The process of claim 22, further comprising, prior to step (c), adding up to about 10 weight percent, based on a total weight of said dry cementitious ingredients, of at least one metal additive selected from the group consisting of metals and metal oxides to the fluid cementitious mixture.

27. The process of claim 26, wherein the at least one metal additive is selected from the group consisting of aluminum, iron, chromium, manganese, lead, microsilicates, a mixture thereof and an alloy thereof.

28. A process for increasing the strength of a concrete composition, comprising forming a concrete composition from a combination of dry cementitious ingredients and water treated with an excess of sodium tripolyphosphate to provide about 0.5-100 ppm residual sodium tripolyphosphate, wherein the concrete composition is at least about 5-45% stronger than a concrete formed from a combination of said dry cementitious ingredients and water which is free of residual sodium tripolyphosphate.

29. A high-strength concrete composition formed according to the process of claim 28.

30. A high-strength shaped article manufactured by a process comprising the steps of:
  (a) treating water with an excess amount of sodium tripolyphosphate to produce treated water having about 0.5-100 ppm residual sodium tripolyphosphate;
  (b) forming a fluid cementitious mixture by mixing about 3-10 weight percent of the treated water with dry cementitious ingredients including about 0-85 weight percent aggregate, about 7-90 weight percent dry cement, and about 0-50 weight percent fly ash within a period of time effective to prevent a substantial reduction of the strength-enhancing effect of the treated water; and
  (c) pouring the fluid cementitious mixture into a casing so that the mixture hardens to form the shaped article.

31. The high-strength shaped article of claim 30, wherein no fly ash is present in the fluid cementitious mixture.

32. The high-strength shaped article of claim 30, wherein no aggregate is present in the fluid cementitious mixture.

33. The high-strength shaped article of claim 30, wherein no fly ash and no aggregate are present in the fluid cementitious mixture.

34. The high-strength shaped article of claim 30, wherein the process further comprises, prior to step (c), adding at least one metal additive selected from the group consisting of metals and metal oxides to the fluid cementitious mixture.

35. The high-strength shaped article of claim 34, wherein the at least one metal additive is selected from the group consisting of aluminum, iron, chromium, manganese, lead, microsilicates, a mixture thereof and an alloy thereof.

* * * * *

UNITED STATES PATENT AND TRADEMARK OFFICE
CERTIFICATE OF CORRECTION

PATENT NO. : 4,930,428
DATED : June 5, 1990
INVENTOR(S) : John F. Schneider et al.

It is certified that error appears in the above-identified patent and that said Letters Patent is hereby corrected as shown below:

Column 2, line 17, after "than" insert --cement--;

Column 2, line 24, after "than" insert --cement--; and

Column 9, line 48, for "strengt" it should read --strength--.

Signed and Sealed this

Twenty-third Day of June, 1992

Attest:

DOUGLAS B. COMER

*Attesting Officer*   *Acting Commissioner of Patents and Trademarks*